United States Patent
Buchsbaum et al.

(10) Patent No.: US 7,051,074 B1
(45) Date of Patent: May 23, 2006

(54) GRAPH ALGORITHM FOR COMMON NEIGHBORHOOD ANALYSIS

(75) Inventors: Adam Louis Buchsbaum, Cranford, NJ (US); Raffaele Giancarlo, New York, NY (US); Jeffery Rex Westbrook, East Haven, CT (US)

(73) Assignee: AT&T Corp., New York, NY (US)

( * ) Notice: Subject to any disclaimer, the term of this patent is extended or adjusted under 35 U.S.C. 154(b) by 1231 days.

(21) Appl. No.: 09/643,580

(22) Filed: Aug. 22, 2000
(Under 37 CFR 1.47)

(51) Int. Cl.
*H06F 15/16* (2006.01)

(52) U.S. Cl. .................. 709/206; 709/218; 709/228; 707/104.1

(58) Field of Classification Search ............... 109/206, 109/218, 220, 224, 225, 227, 228, 230; 707/104.1, 707/2, 5, 10; 705/116; 725/101
See application file for complete search history.

(56) References Cited

U.S. PATENT DOCUMENTS

| | | | | |
|---|---|---|---|---|
| 5,754,938 A | * | 5/1998 | Herz et al. ................. | 725/116 |
| 5,842,199 A | * | 11/1998 | Miller et al. ................ | 707/2 |
| 6,029,175 A | * | 2/2000 | Chow et al. ............. | 707/104.1 |
| 6,029,195 A | * | 2/2000 | Herz ......................... | 725/116 |
| 6,460,036 B1 | * | 10/2002 | Herz ......................... | 707/10 |

OTHER PUBLICATIONS

Feigenbaum et al., Testing and Spot-Checking of Data Streams [Jul. 13, 1999].
Feigenbaum et al., Streaming Algorithms for Distributed, Massive Data Sets [Jun. 25, 1999].
Abello et al., On Maximum Clique Problems in Very Large Graphs [Oct. 13, 1998].
Henzinger et al., SRC Technical Note: Computing on Data Streams [May 26, 1998].
Broder et al., SRC Technical Note: Syntactic Clustering of the Web [Jul. 25, 1997].

* cited by examiner

*Primary Examiner*—Hosain Alam
*Assistant Examiner*—Khanh Quang Dinh

(57) ABSTRACT

A system and method of determining a common neighborhood of users sharing a common activity from a plurality of users is provided. The system and method may be used to predict, for a user in the common neighborhood of users, a potential activity from the activities of at least one other user in the common neighborhood of users.

8 Claims, 14 Drawing Sheets

| USER NAME | ACTIVITY | NUMBER OF OCCURRENCES |
|---|---|---|
| SUE ANTHONY | LINK TO LEADERSHIP.COM | 50 |
| JOHN BROWN | LINK TO CIVILWAR.COM | 100 |
| JOHN BROWN | LINK TO LEADERSHIP.COM | 100 |
| ROBERT LEE | LINK TO CIVILWAR.COM | 50 |
| ROBERT LEE | LINK TO LEADERSHIP.COM | 100 |
| ABE LINCOLN | LINK TO CIVILWAR.COM | 75 |
| ABE LINCOLN | LINK TO LEADERSHIP.COM | 75 |

*FIG. 4A*

| USER NAME | COMMON NEIGHBOR | COMMON ACTIVITY | NUMBER OF OCCURRENCES |
|---|---|---|---|
| JOHN BROWN | ABE LINCOLN | LINK TO CIVILWAR.COM | 60 |
| JOHN BROWN | ROBERT LEE | LINK TO CIVILWAR.COM | 10 |
| JOHN BROWN | SUE ANTHONY | LINK TO LEADERSHIP.COM | 25 |
| ROBERT LEE | ABE LINCOLN | LINK TO LEADERSHIP.COM | 50 |

FIG. 4B

| USER NAME | PREFETCHED DATA LOCATION |
|---|---|
| SUE ANTHONY | CACHE LOCATION OF CIVILWAR.COM |
| JOHN BROWN | CACHE LOCATION OF LEADERSHIP.COM |
| ABE LINCOLN | CACHE LOCATION OF CIVILWAR.COM |

FIG. 4C

GRAPH ALGORITHM FOR COMMON NEIGHBORHOOD ANALYSIS

TECHNICAL FIELD

The invention relates generally to a method and system of making predictions and, more particularly, to a method and system of making predictions based on the interests or characteristics of users sharing common interests or characteristics.

BACKGROUND

Internet/intranet traffic is growing at a phenomenal rate doubling approximately every 100 days. This rapid increase in network traffic presents networking challenges for Internet Service Providers (ISP) and enterprises. An efficient solution to networking problems is to utilize existing networking infrastructure to localize traffic patterns, enabling content requests to be fulfilled locally and efficiently. Localizing traffic patterns accelerates network performance because content requests fulfilled locally protect a network from uncontrollable bottlenecks in the Internet.

Prefetching and caching websites for internet subscribers localizes traffic and dramatically reduces internet congestion. However, prefetching and caching every website at every local ISP is impractical. This problem is also applicable in a general network setting.

SUMMARY OF THE INVENTION

Accordingly, there is a need to predict the interests of a user, such as in a network setting. There is also a need for a method and system to predict a user's interests by evaluating the interests of those who have shown a predisposition to share similar interests.

In accordance with one embodiment, a method and system is provided for determining the common neighborhood of users based on activities shared by a plurality of users. The aforementioned method and system (hereinafter "common neighborhood system") monitors the activities of all users within a predefined network of users, compares the monitored activities of the users within the system and determines which users share similar activities. A common neighborhood is then defined for each user in the system, wherein the neighborhood is comprised of users sharing a plurality of activities. Finally, recommendations and predictions are made for a user based on the activities of the other users in the common neighborhood.

In accordance with another embodiment, there is provided a method and system to determine a common neighborhood of users sharing a common activity from a plurality of users. The system monitors the activities of a number of users and then implements a common neighborhood process to determine each user's common neighborhood. The system then predicts an activity of a user based on the activities of at least one of the members of the user's common neighborhood.

In another embodiment, the system prefetches data associated with the predicted activity of the user. The prefetched data may be a website that the system predicts that the user will desire to access. After prefetching the data, the system caches the data into a local memory medium in anticipation of usage by the user.

In a further embodiment, the system provides for the recommendation to the user of an activity that is an activity of at least one of the user's common neighbors. The recommended activity may be, but is not limited to, a calling service, a website, or a business service.

In another embodiment, the system examines the references of a number of documents. The system then provides for the determination of a common neighborhood of documents that share at least one reference or citation in common. The system then provides for the recommendations of references and citations to the author of a document based on the references of at least one other document in the common neighborhood.

It is not intended that the invention be summarized here in its entirety. Rather, further features, aspects and advantages of the invention are set forth in the following description and drawings.

BRIEF DESCRIPTION OF THE DRAWINGS

The accompanying drawings illustrates certain embodiments of the invention.

FIGS. 4A, 4B and 4C illustrate an example of a user activity database, a common neighborhood database and a prefetching database, respectively;

DETAILED DESCRIPTION

With reference to the Figures, several embodiments will now be shown and described. In accordance with an embodiment, FIG. 1 illustrates a general overview of a prediction system 10, employing a common neighborhood engine 115, for predicting the activities of users, in this case network users, through the use of a common neighborhood process and methodology.

In general, the common neighborhood process may be utilized to determine a common neighborhood of vertices that share arcs to other vertices, where the vertices may relate to an activity and an arc may relate to a user. By tracking the activities of users, it is thus possible to define a common neighborhood of users sharing common activities through the use of the common neighborhood process. By defining common neighborhoods, a potential activity of one user in a common neighborhood may be predicted from the activities of other users in the same common neighborhood.

Figure 1:
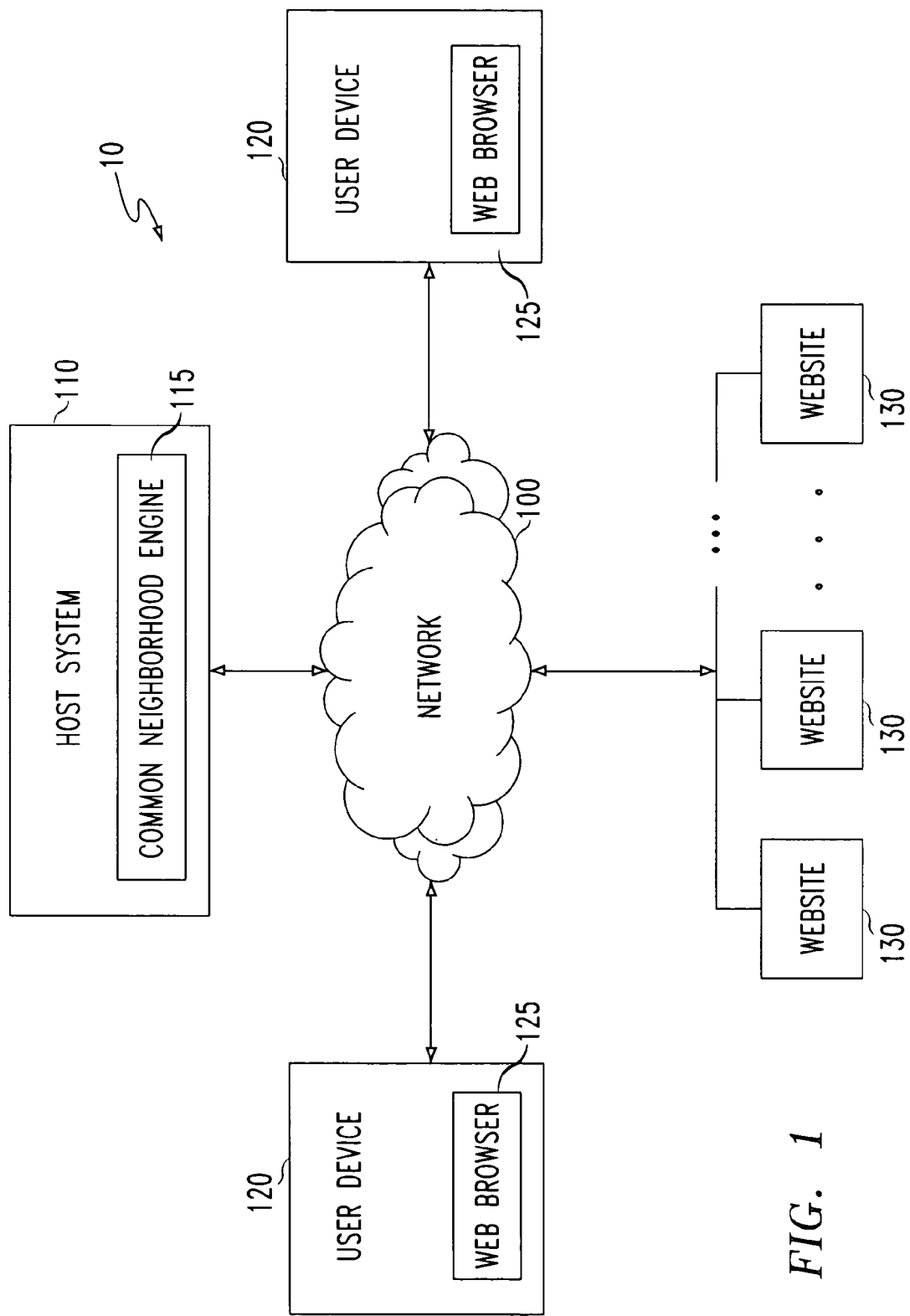
FIG. 1 illustrates an overview of a common neighborhood predicting system.

Turning to a more detailed description of FIG. 1, prediction system 10 includes a host system 110 and user devices 120, all of which are capable of conducting communications over network 100. Network 100 may include an intranet, the internet, a LAN, or any network capable of enabling voice, video and data communications.

User device 120 includes a web browser 125 for browsing the internet and accessing websites, e.g., web site 130. User device 120 may take the form of a computer with a browser, WebTV, PDA with a browser or any device able to access the Internet to enable a user to surf the web.

Host system 100 monitors the activities of a plurality of users 120 and stores the information corresponding to a website 130 when a user 120 visits one of a plurality of websites 130. This information may be the URL address of the visited website or any information which may be utilized to track which websites a user visited. Host system 110, in combination with a common neighborhood program or engine (hereinafter "engine") 115, determine a common neighborhood of users sharing a common activity from a plurality of users, and predict for a user in the common neighborhood of users a potential activity from the activities of at least one other user in the common neighborhood of users.

Host system 110 may be the internet server(s) of an Internet Service Provider (ISP) or a separate network system or component capable of communicating with the servers of the ISP.

In this way, a system and method is provided which enables prediction of potential activities of a user with some accuracy. This prediction may then be utilized in various applications, such as prefetching website information and recommending web sites for a user. These and other applications are discussed further below in greater detail.

Figure 2:
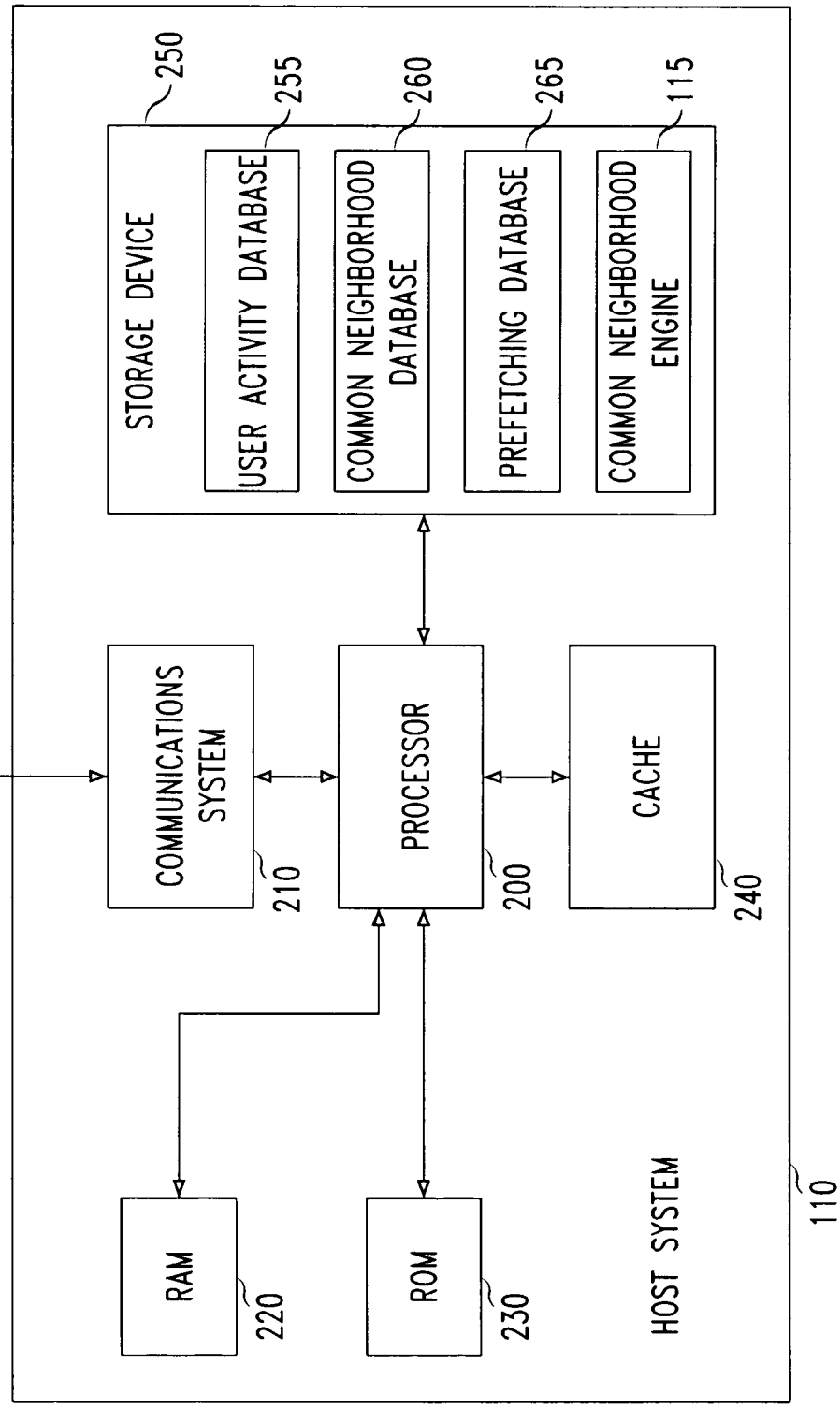
FIG. 2 illustrates an overview of a host system in which the common neighborhood resides.

FIG. 2 illustrates a general overview of host system 110 of FIG. 1. Host system 110 may include conventional computer/server components, such as a processor 200, a communications system 210 for communicating across network 100, RAM 220, ROM 230 and a storage device 250. Host system 110 may further include a cache 240 for maintaining prefetched data in anticipation of usage by a user.

The storage device 250 maintains a user activity database 255, a common neighborhood 260, a prefetching database 265, common neighborhood engine 115, and may also store programs and applications implemented by processor 200.

Common neighborhood engine 115 is a program for determining the common neighborhood of vertices that share arcs to other vertices. The determination of a common neighborhood may be utilized to predict potential activities of a user in a common neighborhood based on the activities of other users in the common neighborhood, e.g., users who share activities in common with the first user. These activities may be calling service plans, internet websites, or business services.

Similarly, common neighborhood engine 115 may be utilized to recommend references or citations to authors whose article shares similar references as documents that have been previously written. Further, common neighborhood engine 115 may be used to predict the websites that a user will visit and prefetch those websites to a local cache 240 ex ante to decrease the access time and reduce the problems associated with internet congestion.

While host system 110 may be a single server unit, the functionality of host system 110 may be distributed across a plurality of servers and network devices. For example, the tracking of user activities may be performed in a different system with the tracking information being available for use by host system 110. Likewise, a local cache, e.g., cache 240, may be provided in host system 110 or may be maintained in a proxy server or another network device or system.

Figure 3A:
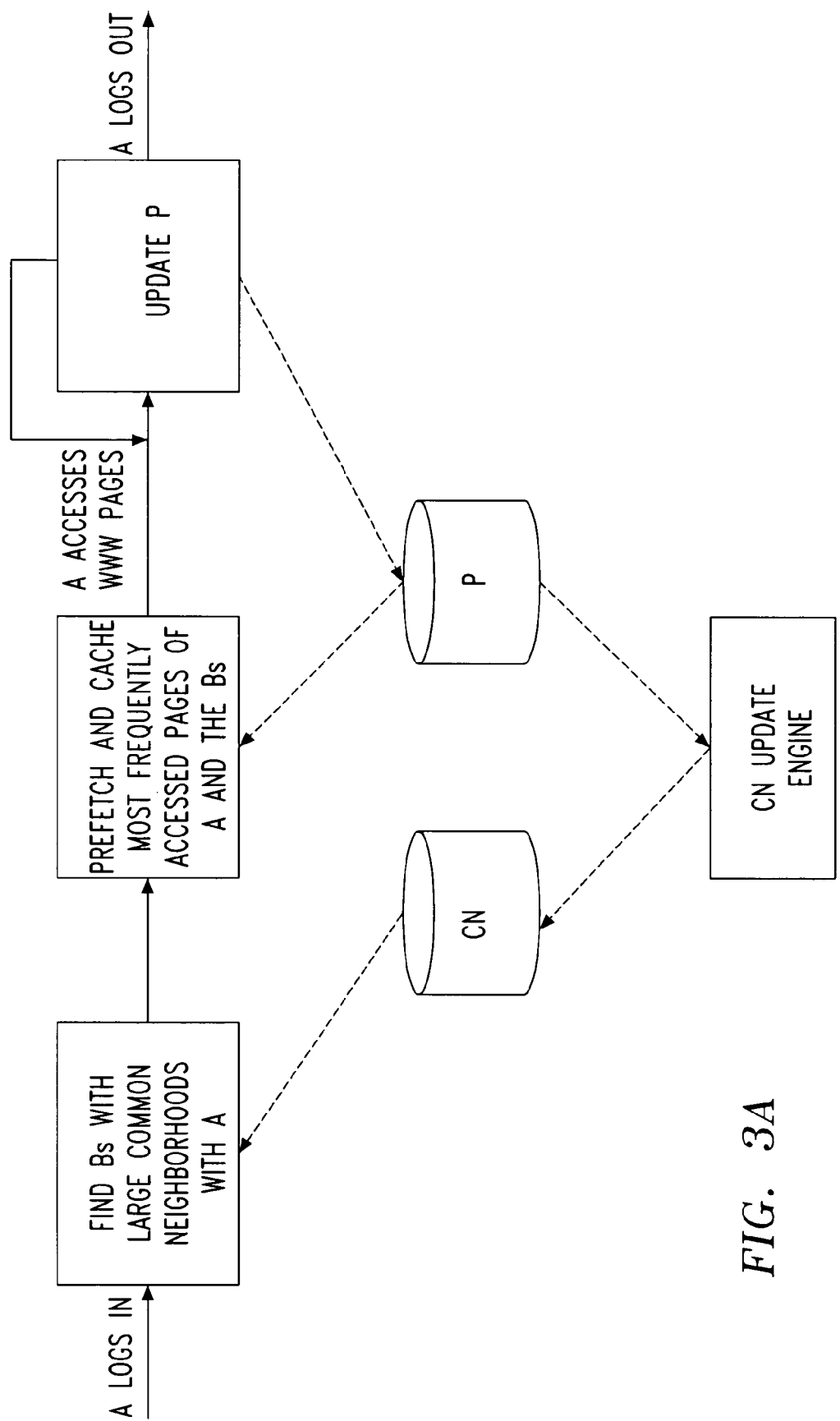
FIGS. 3A and 3B illustrate an example of a prefetching and recommendation method and system, respectively.

FIG. 3A illustrates a general process overview of common neighborhood engine 115 for employing common neighborhoods for prediction and prefetching information associated with web pages accessed by users. As shown, when a user A logs in, host system 110 determines other users (e.g., user B) who access many pages in common with A, using common neighborhood database 260 of large common neighborhoods. To speed service to A, host system 110 prefetches and caches those pages frequently accessed by A and each B in the past, using prefetching database 265 which may contain a record of each user's most frequently accessed web pages. A's current page accesses are recorded in prefetching database 265 (e.g., database 265 is updated) for future use by host system 110 and common neighborhood engine 115.

In this way, if A and B have previously accessed many pages in common, then pages newly accessed by B might be accessed by A.

Host system 110 may operate common neighborhood engine 115 asynchronously, e.g., nightly in a batch mode, to keep common neighborhood database 260 up to date. The general processes of common neighborhood engine 115 are described further below with reference to FIGS. 5 and 6.

Figure 3B:
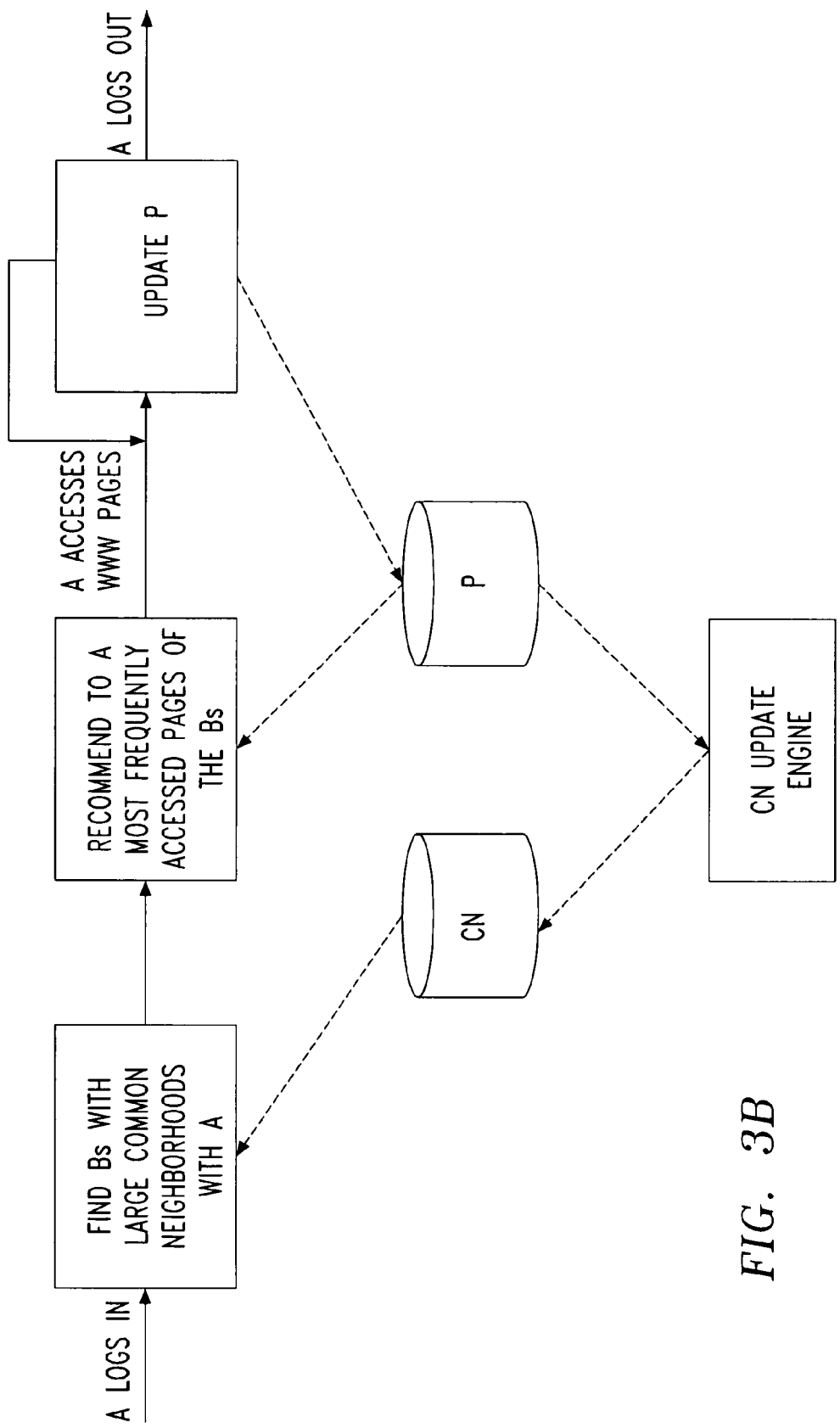

FIG. 3B illustrates a general process overview of common neighborhood engine 115 for employing common neighborhoods for prediction and recommendation of web pages or sites to a user. The operations of host system 110 are similar to that described above for FIG. 3A, except that, instead of prefetching, host system 110 recommends web pages to A based on the belief that A and B share common interests.

FIG. 4A illustrates an example of user activity database 255. User activity database 255 may maintain user information associated with the activities of the users. User activity database 255 may include a user name field 400, an activity field 405 and a number of occurrences field 410. User name field 400 contains information identifying a user, such as a name (e.g., Sue Anthony), numeric identifier, etc. Activity field 405 maintains information associated with an activity of a user, such as a web site visited by the user. This information may be a URL address of the visited website. Number of Occurrences field 410 identifies the number of occurrences of an activity by a user. For example, Sue Anthony visited a website Leadership.com fifty (50) times.

FIG. 4B illustrates an example of a common neighborhood database 260 which maintains information derived from processing performed by common neighborhood engine 115. Common neighborhood database 260 includes a user name field 420, a common neighbor field 425, a common activity 430 and a number of occurrences field 435.

User name field 420 contains information identifying a user, such as a name (e.g., John Brown), numeric identifier, etc.

Common neighbor field 425 maintains information identifying a common neighbor of a user. For example, Abe Lincoln, Robert Lee and Sue Anthony are common neighbors of John Brown.

Common activity field 430 maintains information associated with a common activity between a user and a common neighbor of the user, such as a web site visited by both the user and the common neighbor. This information may be a URL address of the visited website.

Number of Occurrences field 435 identifies the number of occurrences of a common activity between a user and a common neighbor of the user. For example, John Brown and Abe Lincoln visited the website CivilWar.com approximately sixty (60) times.

FIG. 4C illustrates a prefetching database 265 for maintaining prefetched information for a user. Prefetching database 265 may include a user name field 450 and a prefetched data location field 455. User name field 450 contains information identifying a user, such as a name (e.g., John Brown), numeric identifier, etc. Prefeteched data location field 455 identifies the location or address where the prefetched information for a user is maintained—for example, in cache 240.

Regarding the databases shown in FIGS. 4A–C, it is to be understood that the data and fields, as well as the number of databases, can be readily modified from the described embodiment and adapted to provide variations for operating the system and method described herein. Furthermore, each field may contain more or less information, as desired.

Provided below are a few examples of applications for which the common neighbor process may be employed with reference to FIGS. 5–11.

Common Neighborhood Process

Prior to discussing the applications, it is appropriate to discuss the common neighborhood process and methodology. The common neighborhood process enables determination of "a common neighborhood" of vertices that share arcs to other vertices. The process will be described below with reference to FIG. 5.

Figure 5:
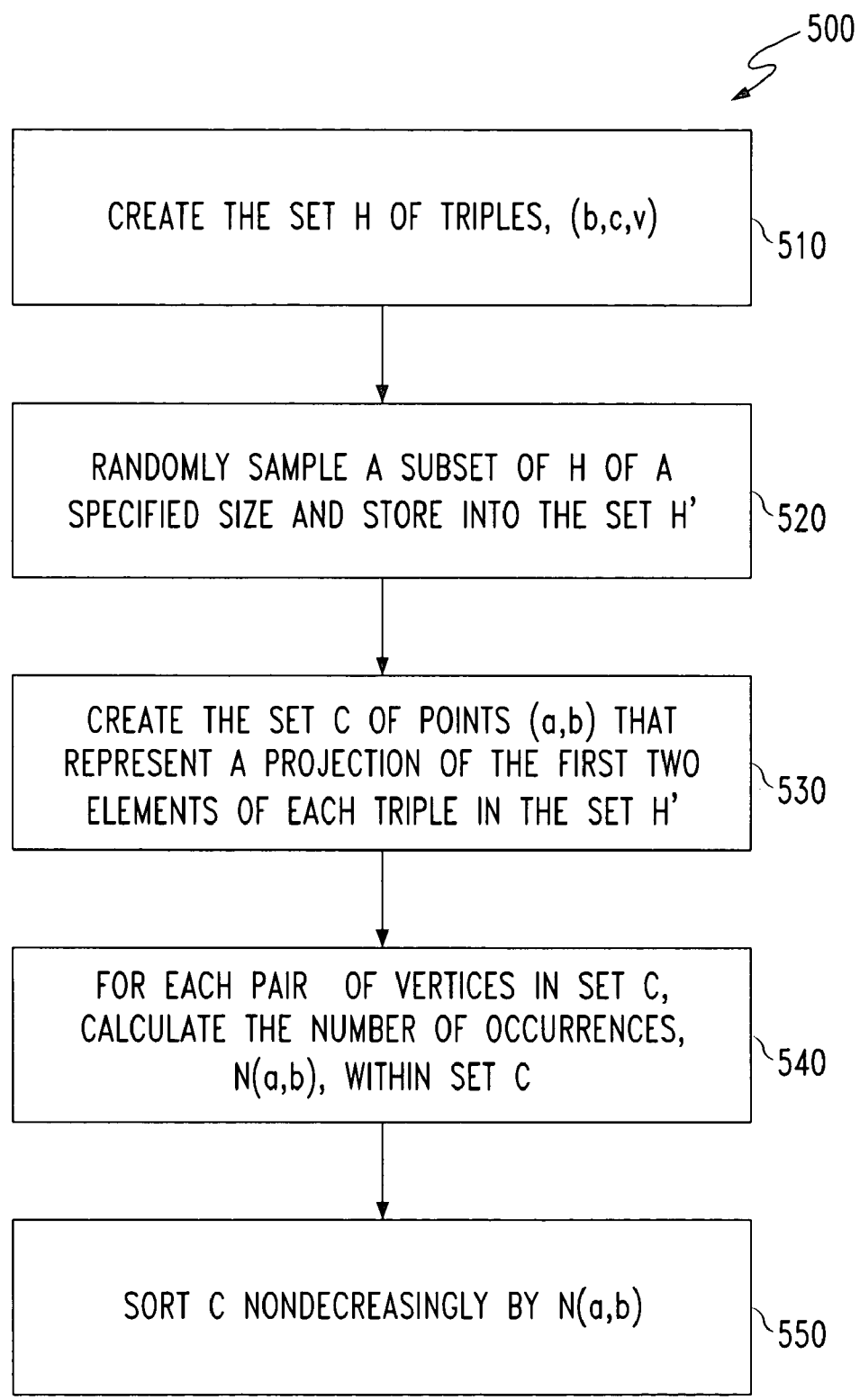
FIG. 5 is a flowchart illustrating a process by which a common neighborhood is determined.

FIG. 5 illustrates a flowchart of the process 500 by which a common neighborhood is determined for a set of vertices and edges. These vertices and edges may be defined according to the desired application. For example, the vertices and arcs may represent internet users and their web surfing activities which may be used to determine a common neighborhood of internet users having a common activity or activities.

The process 500 is commenced in step 510 when host system processor 200 uses a set E of edges, derived from a set of monitored data stored in the user activity database 255, to construct a set H of triples (b,c,v). Mathematically, this step may be expressed as the following two steps:

$$\text{for } v \in V, \text{ construct } H(v)=\{(b,c):(v,b) \in E \text{ and } (v,c) \in E\}; \quad (1)$$

$$H = U_{v \in V} H(v). \quad (2)$$

Host system processor 200 then randomly samples a subset of a specified size of set H' in step 520 and stores the randomly sampled triples in the set H'.

In step 530, the set C is created. This set represents a projection of the first two elements (a,b) of each triple in the set H' onto the point c. Mathematically, this may be represented as:

$$C=\{(a,b): \exists c, (a,b,c) \in H'\}.$$

In step 540, host system processor 200 then calculates the number of occurrences of each pair (a,b) within the set C and stores this value as N(a,b). Mathematically, this step may be represented as:

$$\text{for each } (a,b) \in C, \text{ calculate } N(a,b)=|\{(a,b,c,) \in H'\}|.$$

In step 550 host system processor 200 sorts the set C in nondecreasing order by N(a,b).

Random Sampling Process

While the general common neighborhood process 500 of FIG. 5 may be employed efficiently for a small amount of input data, the processing time required becomes significant when dealing with a larger amount of input data. To improve the efficiency of the process 500 while maintaining the feasibility and accuracy of the common neighborhood process, a random sampling process 600 is discussed below with reference to FIG. 6 to reduce the amount of data to be processed in the determination of a common neighborhood of vertices.

Figure 6:
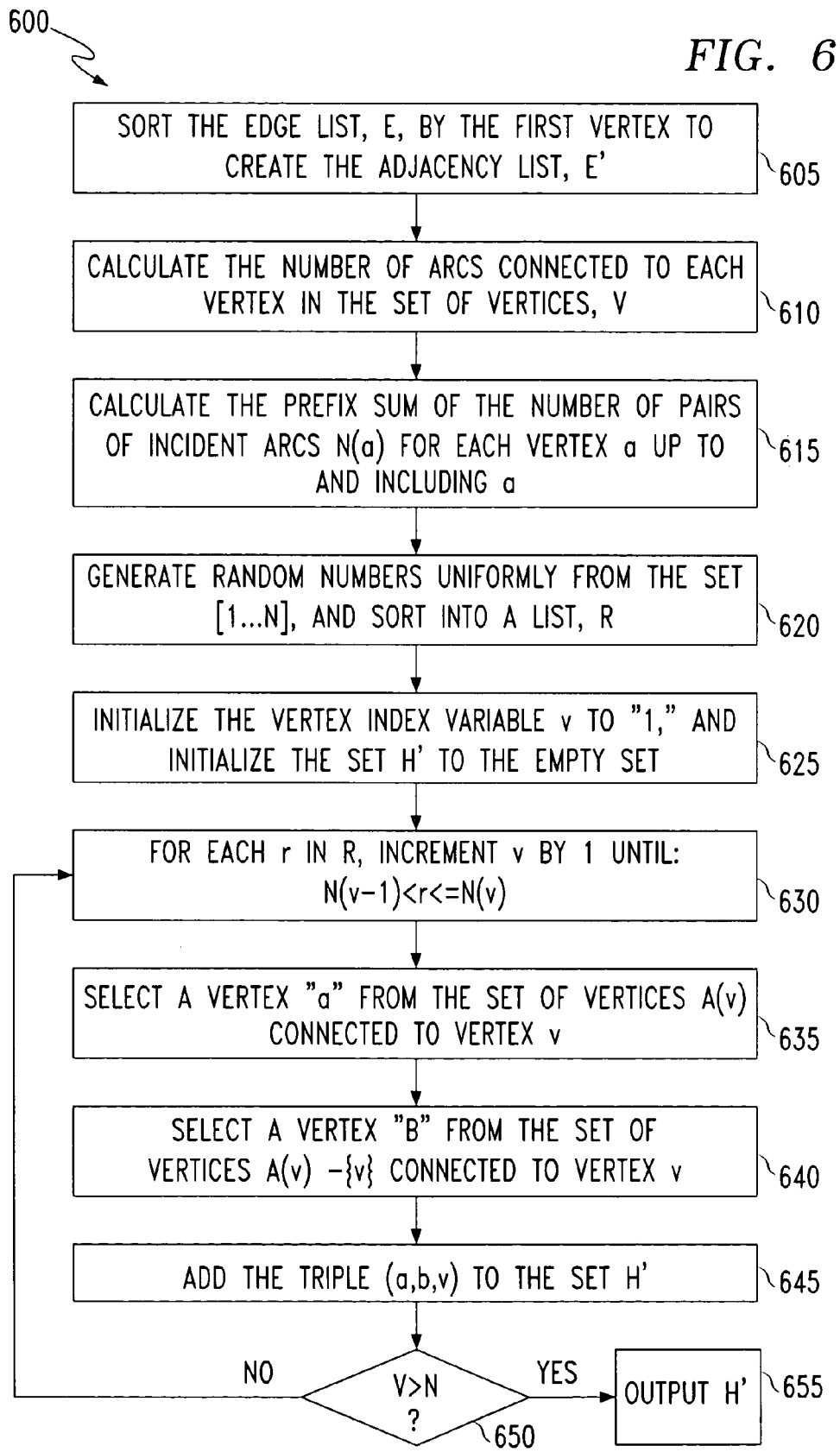
FIG. 6 is a flowchart illustrating a process by which a set of triples is randomly sampled.

FIG. 6 illustrates a flowchart of the process 600 by which the set H is randomly sampled in the common neighborhood process illustrated in FIG. 5. In step 605, host system processor 200 initiates the random sampling process 600 by sorting the edge list E by the first vertex to create the adjacency list E'.

In step 610, host system processor 200 then calculates the number of arcs connected to each vertex in the set V of vertices. Mathematically, step 610 may be represented as:

$$\text{for } b \in V, \text{ calculate } \deg(b)=|A(b)|, \text{ the degree of } b;$$

where: A(b)=set of edges incident on vertex b.

Host system processor 200 then calculates in step 615 the prefix sum of the number of pairs of incident arcs, N(a), for each vertex "a" up to and including "a". Mathematically, this step may be expressed as:

$$N(0)=0;$$

$$N(a)=\Sigma_{i=1}^{a}[\deg(i)*\deg(i-1)]/2;$$

$$N=N(|V|).$$

In step 620, host system processor 200 generates the random numbers uniformly from the set [1 . . . N], and sorts the numbers into a list, R.

In step 625, the host processor 200 then initializes the vertex index variable v to "1," and initializes the set H' to the empty set.

For each random number r in the set R, host system processor 200 increments the vertex index variable by one until the random number r is greater than the sum of the number of pairs of incident arcs up to and including vertex v−1, but is less than the sum of the number of pairs of incident arcs for each vertex up to and including vertex v. Host system processor 200 then selects a vertex in step 635 "a," from the set of vertices A(v) connected to vertex v. Similarly, in step 640, host system processor 200 then selects a vertex "b" from the set of vertices connected to vertex v, excluding the previously selected vertex "a." Thus, the set from which host system processor 200 selects vertex "b" is the set A(v)−{v}. In step 645, host system processor 200 adds the newly formed triple, (a,b,v) to the set H'.

In step 650, host system processor 200 compares the vertex index variable, v, to N, the total number of vertices in the graph. If v is less than or equal to N, the processor 200 transfers control to step 630. However, if the vertex index variable, v, is greater than N, the processor 200 transfers control to step 655. In step 655 host system processor 200 outputs the set H', as the result of the random sampling algorithm, to the common neighborhood process 500.

Recommending Phone Service and Calling Plans

Since the deregulation of the telephone industry, there has been an influx of telephone service providers into the market place. The highly competitive nature of the telephone industry requires telephone providers to formulate new ideas and services for their subscribers to expand their market share. These new telephone services are typically advertised to subscribers through conventional media, such as through the television, newspapers or through the telephone. These forms of advertising to the general public or subscriber market may be inefficient and impractical. Moreover, subscribers who are uninterested in the new services are annoyed when they receive these advertisements over the telephone from their telephone provider.

Predicting telephone service or plan interests for a telephone subscriber is an affordable and practical alternative to enable a marketing plan to be focused on those subscribers who may have an interest in the new service and plan.

Through the use of the common neighborhood process and model, it is possible to predict whether a subscriber would be interested in a particular type of telephone service or plan or generally in a marketing promotion. The services or plan interests of a telephone subscriber may be predicted with some accuracy by observing the services and plans subscribed to by other telephone subscribers who share common interests. Statistically, the common interests of two subscribers may be correlated by monitoring the services, plans and calling habits of the subscribers. Accordingly, phone service recommendations and selections may then be efficiently tailored to the needs of a particular subscriber by examining the services of a common neighbor of that subscriber, an example of which is discussed below with reference to FIG. 7.

Figure 7:
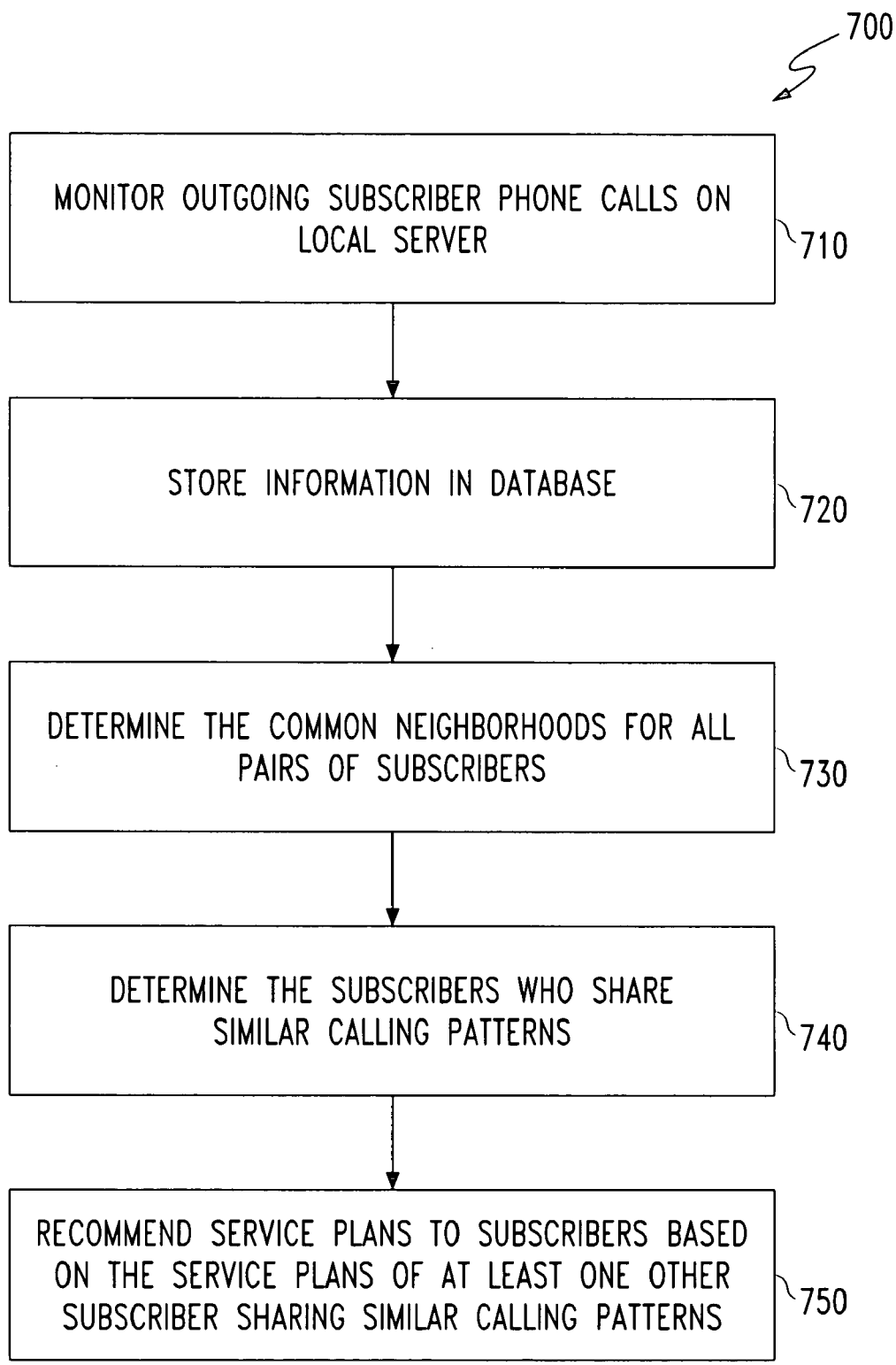
FIG. 7 is a flowchart illustrating a process by which a phone calling service is recommended to a subscriber based on the calling patterns and calling service plans of at least one subscriber in the common neighborhood.

FIG. 7 illustrates a flowchart of the process by which a phone calling service is recommended to a subscriber based on the calling patterns and calling service plans of at least one subscriber in the common neighborhood. In step 710, host system 110 monitors outgoing subscriber phone traffic and stores the data pertaining to this traffic in step 720.

Thereafter, in step 730, host system processor 200 then executes the common neighborhood algorithm, residing in common neighborhood engine 115, to determine the common neighborhood for each pair of phone subscribers.

In step 740, host system processor 200 utilizes the common neighborhoods of each subscriber to determine the subscribers who share similar calling patterns.

In step 750, host system 110 recommends a service plan for a particular subscriber based on the service plan of a least one other subscriber sharing similar calling patterns as the subscriber to whom host system 110 makes the recommendation. The service plans may include long-distance calling plan, a local-area calling plan, a cellular calling plan, voice mail, call waiting, call forwarding, internet service, a pager calling plan, call waiting plan, caller ID plan or any other plan relating to services which may be provided by a telephone service provider.

While the above describes recommendation in the context of telephone subscribers, it should be understood that the recommendation system and method may be applied to any subscription-related service or industry.

Recommending Business Services

The highly competitive climate in today's business environment requires that each industry constantly improve its marketing and advertising by formulating new ideas and services to expand their market share. Traditional forms of advertising to the general public or subscriber market may be unfocused, inefficient, and impractical. Moreover, subscribers who are uninterested in the new services are often annoyed when they receive these advertisements over the telephone.

Predicting a business or service of interest for a potential consumer is an invaluable, affordable, and practical alternative to enable a marketing plan to be focused on those subscribers who may have interest in a new good or service.

Through the use of the common neighborhood process and model, it is possible to predict whether a subscriber would be interested in a particular type of good or service. The goods or services of interest may be predicted with some accuracy by observing the websites that are visited by other internet subscribers who share common interests. Statistically, the common interests of two internet subscribers may be correlated by monitoring the websites visited by both subscribers. Accordingly, goods or service recommendations and selections may then be efficiently tailored to the needs of a particular subscriber by examining the websites visited by a common neighbor of that subscriber and recommending to the subscriber the goods or services associated with the websites visited by the common neighbor, an example of which is discussed below with reference to FIG. 8.

Figure 8:
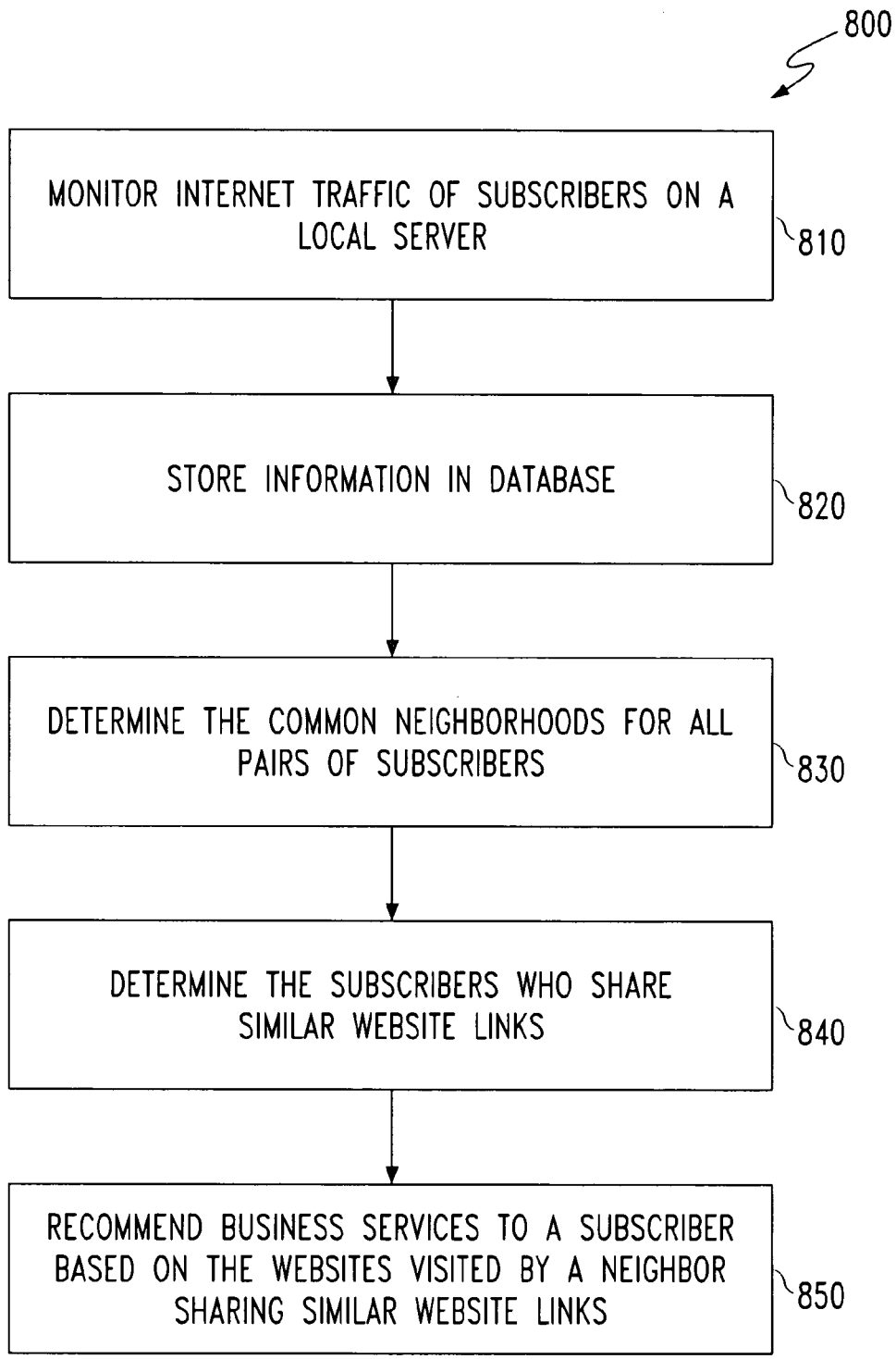
FIG. 8 is a flowchart illustrating a process by which a business service is recommended to an internet subscriber based on the websites visited by at least one subscriber in the common neighborhood in accordance with a further embodiment.

FIG. 8 is a flowchart illustrating a process by which a business service is recommended to an internet subscriber based on the websites visited by at least one subscriber in the common neighborhood.

In step 810, host system 110 monitors outgoing subscriber phone traffic and stores the data pertaining to this traffic in step 820.

Host system processor 200 then executes the common neighborhood algorithm, residing in common neighborhood engine 115, in step 830 to determine the common neighborhood for each pair of internet subscribers.

In step 840, host system processor 200 utilizes the common neighborhoods of each subscriber to determine the subscribers who have visited similar websites.

In step 850, host system 110 recommends a business service for a particular subscriber that is related to a website visited by of a least one other subscriber sharing similar website linking patterns as the subscriber to whom host system 110 makes the recommendation.

Prefetching and Caching Internet Websites

Prefetching and caching websites for internet subscribers localizes traffic and dramatically reduces internet congestion. However, prefetching and caching every website at every local ISP is impractical. This problem is also applicable in a general network setting.

Predicting websites which an internet subscriber will visit in the future, and prefetching only those websites, is an affordable and practical alternative. The websites an internet user may visit in the future may be accurately predicted by observing the websites visited by other internet subscribers who share common interests. Statistically, the common interests of two internet subscribers may be correlated by monitoring the internet websites visited by both subscribers.

Accordingly, through the use of the common neighborhood process and model, it is possible to predict the interests of a network user. An example of such prediction is discussed below with reference to FIG. 9.

Figure 9:
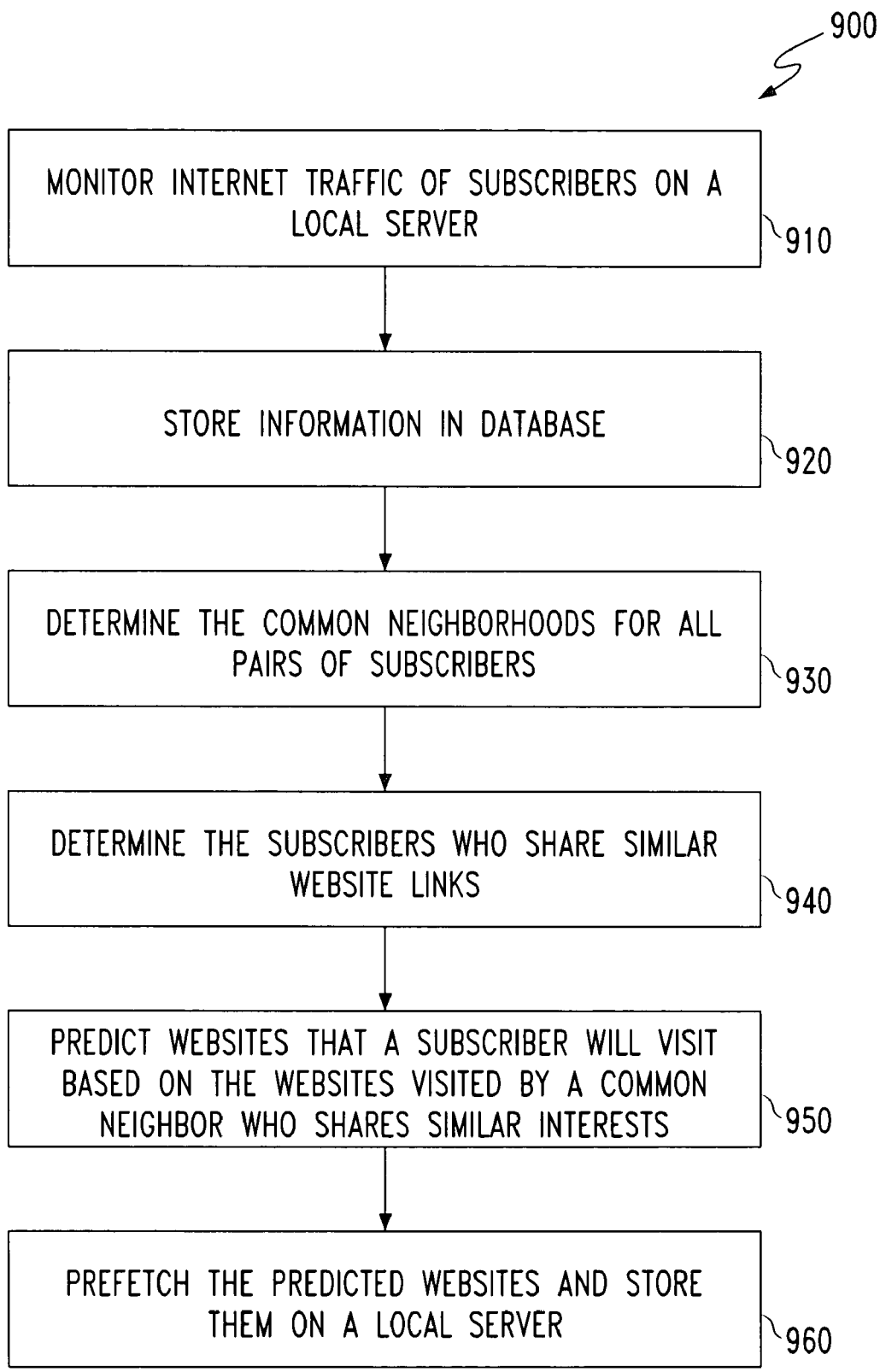
FIG. 9 is a flowchart illustrating a process by which internet websites are prefetched and cached locally based on the websites visited by at least one subscriber in the common neighborhood in accordance with a another embodiment.

FIG. 9 is a flowchart illustrating a process by which internet websites are prefetched and cached locally based on the websites visited by at least one subscriber in the common neighborhood. In step 910, host system 110 monitors outgoing subscriber phone traffic and stores the data pertaining to this traffic in step 920.

Host system processor 200 then executes the common neighborhood algorithm, residing in common neighborhood engine 115, in step 930 to determine the common neighborhood for each pair of internet subscribers.

In step 940, host system processor 200 utilizes the common neighborhoods of each subscriber to determine the subscribers who have visited similar websites.

In step 950, host system 110 predicts a website that a subscriber is likely to visit based on the websites visited by at least one other internet subscriber who is a common neighbor and who has visited similar websites.

In step 960, host system processor 200 prefetches the websites that it predicted the user is likely to visit and stores them in the prediction database 260. The prefetched data may be stored in a local cache or at a location accessible by host system processor 200.

Recommending Internet Websites

In today's rapidly changing e-commerce internet environment, a first mover (e.g., a company, entity, etc.) who establishes name recognition gains a distinct strategic advantage over its competitors. To increase consumer awareness, it is necessary that an emerging company improve its marketing and advertising by focusing its marketing plan to expand its market share. Traditional forms of advertising to the general public or subscriber market may be unfocused, inefficient, and impractical. Moreover, subscribers who are uninterested in the new services are often annoyed when they receive spam advertisements over the internet or directly to their personal e-mail accounts.

Through the use of the common neighborhood process and model, it is possible to predict whether a subscriber would be interested in a particular website. The website of interest may be predicted with some accuracy by observing the websites that are visited by other internet subscribers who share common interests. Statistically, the common interests of two internet subscribers may be correlated by monitoring the websites visited by both subscribers. Accordingly, website recommendations may then be efficiently tailored to the interests of a particular subscriber by examining the websites visited by a common neighbor of that subscriber and recommending to the subscriber the websites visited by the common neighbor, an example of which is discussed below with reference to FIG. 10.

Figure 10:
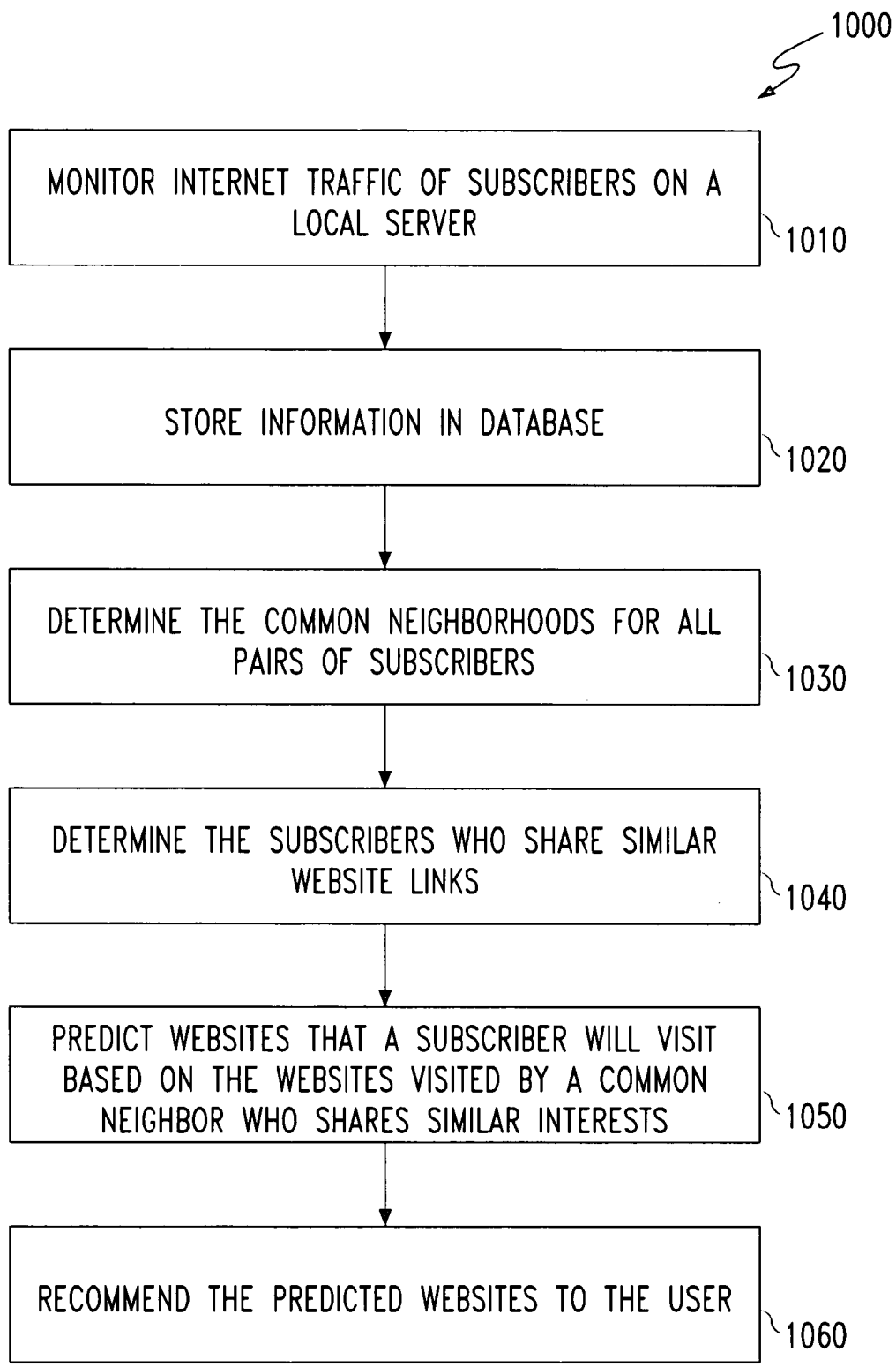
FIG. 10 is a flowchart illustrating a process by which internet websites are recommended based on the websites visited by at least one subscriber in the common neighborhood in accordance with another embodiment.

FIG. 10 is a flowchart illustrating a process by which host system 110 recommends internet websites to an internet subscriber based on the websites visited by at least one subscriber in the common neighborhood.

In step 1010, host system 110 monitors internet traffic of subscribers and stores the data pertaining to this traffic in step 1020. Host system processor 200 then executes the common neighborhood algorithm, residing in common neighborhood engine 115, in step 1030 to determine the common neighborhood for each pair of internet subscribers.

In step 1040, host system processor 200 utilizes the common neighborhoods of each subscriber to determine the subscribers who have visited similar websites.

In step 1050, host system 110 predicts a website that a subscriber is likely to visit based on the websites visited by at least one other internet subscriber who is a common neighbor and who has visited similar websites.

In step 1060, the host system 100 recommends to the user those websites that it predicted the user is likely to visit.

Recommendations of References and Citations

While the common neighborhood process and model has been described above for predicting user activity, this process may also be used to make predictions for use in other applications not directly related to tracking user activities.

For example, an author (or editor) writing a paper on some subject matter must often perform painstaking manual research to ascertain other relevant or related works which may be useful in the preparation of the paper. While searches may be conducted on available databases according to the topic of the paper, the searching and filtering of these searches is often time-consuming and may not result in the discovery of relevant references for use in the paper.

Predicting references which may be useful in the preparation of a paper or other authored-type of work is an affordable and practical alternative. The potential references an author may desire may be accurately predicted by discovering other works that share common reference citations. Accordingly, through the use of the common neighborhood process and model, it is possible to predict the references or other works desired by an author, an example of which is discussed below with reference to FIG. 11.

Figure 11:
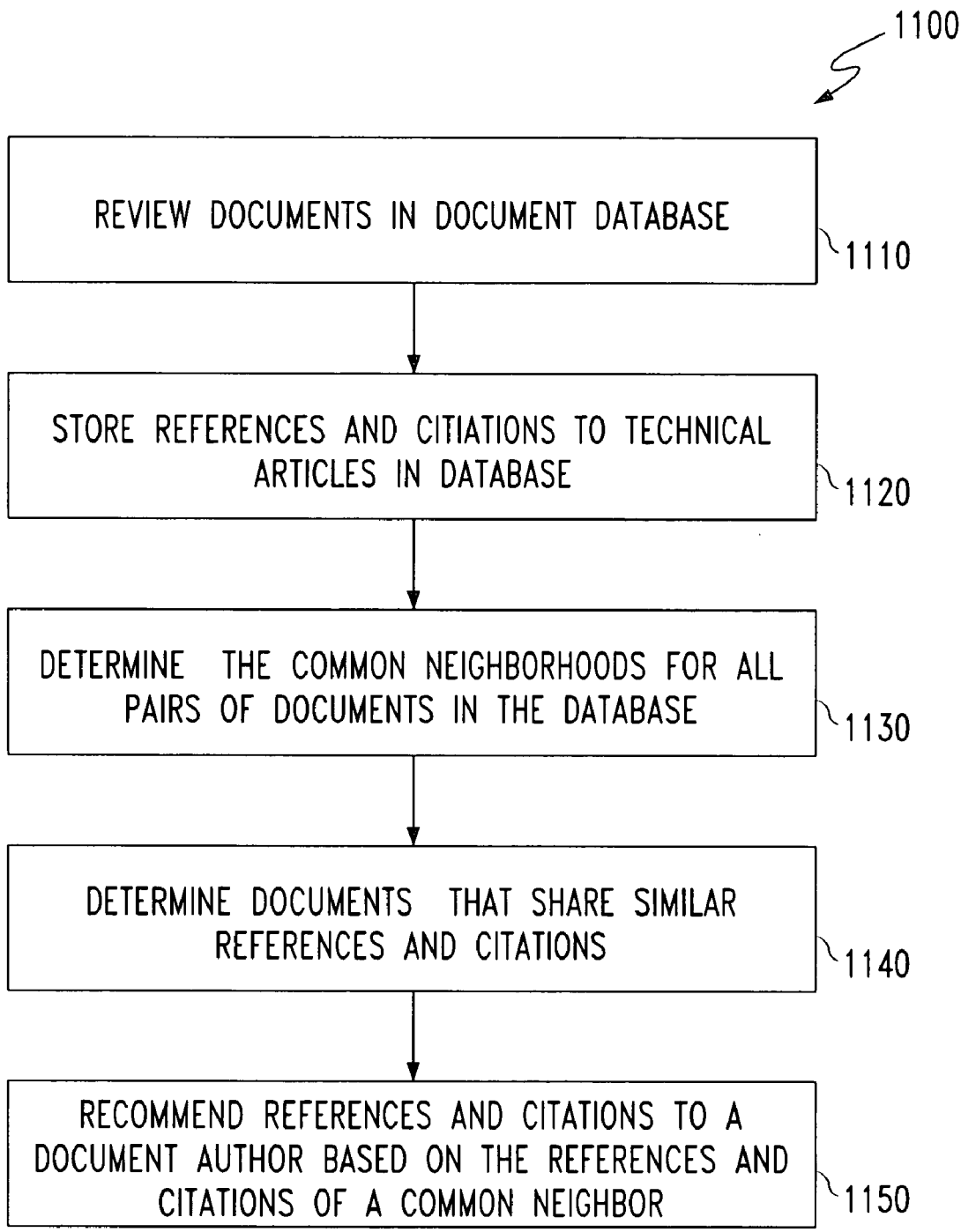
FIG. 11 is a flowchart illustrating a process by which recommendation of references are made to the author of a document based on the references of at least one document in the common neighborhood in accordance with a further embodiment.

FIG. 11 is a flowchart illustrating a process by which host system 110's recommendation of references are made to the author of a document based on the references of at least one other document in the original document's common neighborhood.

In step 1110, the host user processor searches the documents stored locally in the document database. The references and citations that are contained within these documents are stored in the document database in step 1120.

Host system processor 200 then executes the common neighborhood algorithm, residing in common neighborhood engine 115, in step 1130 to determine the common neighborhood for each pair of internet subscribers.

In step 1140, host system processor 200 determines documents within the common neighborhood that share similar references and citations.

Host system 110 then recommends references and citations to the author based on the references and citations of a common neighbor.

Market Segment Determination

Customers across specific demographics tend to exhibit similar consumption patterns. Therefore, predictions may be made concerning future purchases of a consumer based on the consumption patterns of a member of the consumer's common neighborhood. If these inferences are made across a wide range of consumers, market segments may be defined. A process by which a market segment could thusly be defined is invaluable to any corporation.

A demonstration of the usefulness of a market segmenting can be found for example in the telephone service industry, for which large neighborhoods in a call detail graph can generate clusters of callers with similar calling patterns. These clusters may then be utilized to segment the phone service market. For example, if a non-customer, A, shares a large inbound calling neighborhood with a known customer, B, information about A may be inferred from information about B. This information may then be used to further define the relevant markets and possibly win A as a new customer.

Accordingly, through the use of the common neighborhood process and model, it is possible to define market segments based on the consumption patterns of the members in the common neighborhood, an example of which is discussed below with reference to FIG. 12.

Figure 12:
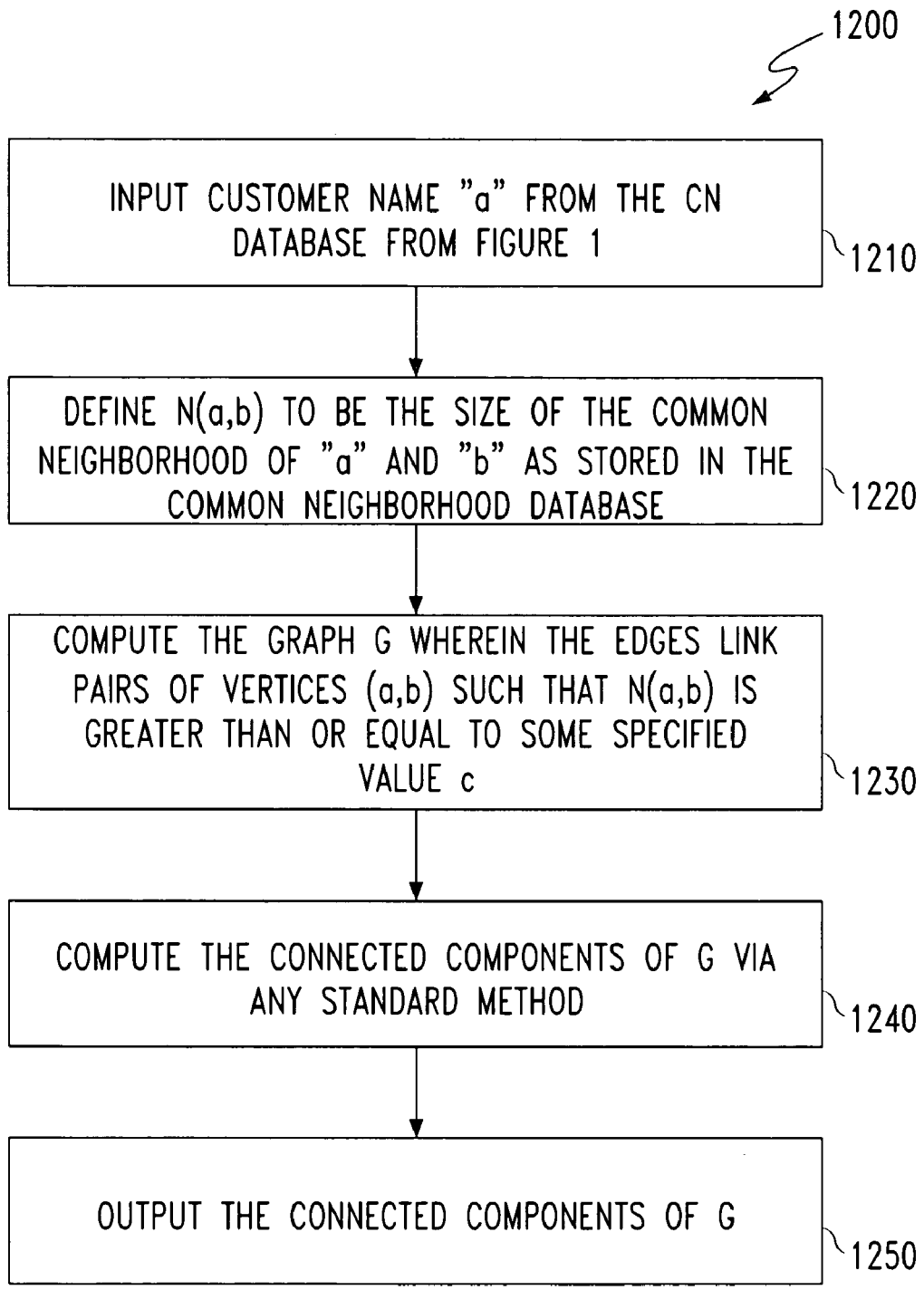
FIG. 12 is a flowchart illustrating a process by which a market segment is defined based on the common neighborhoods determined by a common neighborhood engine in accordance with one embodiment.

FIG. 12 is a flowchart illustrating a process by which a market segment is defined based on the common neighborhoods formed by the common neighborhood engine.

In step 1210, host system processor 220 inputs a customer name, "a," from the common neighborhood database 260.

In step 1220, host system processor 220 then defines the size of the common neighborhood as N(a,b), as stored in the common neighborhood database 260.

Host system processor 220 then computes the graph of a market segment in step 1230. The market segment graph is defined such that edges joining vertices, for example, correspond to two customers' "a" and "b" when N(a,b) is greater than or equal to a given value "c." Mathematically, step 1230 may be represented as:

$$G=(V,E) \text{ where } E=\{(a,b)\epsilon V\times V:N(a,b)\geq c\}.$$

In step 1240, host system processor 220 then computes the connected components of G using any standard method known to those of ordinary skill in the art.

Finally, host system processor 220 outputs the connected components of the market segment graph in step 1250. This process determines a market segment of customers who share a significant quantity of activities because each connected component contains a maximal set of customers such that for each "a" there is another "b" such that "a" and "b" have a large common neighborhood. Thus, customers identified in this manner may be treated as a market segment.

It will be apparent to those skilled in the art that various modifications and variations can be made in the system and processes of the present invention without departing from the spirit or scope of the invention. Thus, it is intended that the present invention covers the modifications and variations of this invention provided they come within the scope of the appended claims and their equivalents. In this context, equivalent means each and every implementation for carrying out the functions recited in the claims, even if not explicitly described herein.

What is claimed is:

1. A method comprising:
    determining a common neighborhood of users sharing a common activity from a plurality of users by
        creating a set H of triples (b,c,v) where b,c, and v are vertices;
        sampling randomly a subset of H of a specified size into a set H';
        creating a set C of points (a,b) that are a projection of a first two vertices of each triple in set H';
        calculating a number of occurrences, N(a,b), for each pair of vertices within the set C; and
        sorting the C nondecreasingly by N(a,b), wherein the set C of points (a,b) represents the users in a common neighborhood, and the set E of edges represents the activities of the users within the common neighborhood; and
    predicting for a user in the common neighborhood of users a potential activity from the activities of at least one other user in the common neighborhood of users.

2. The method of claim 1, wherein the random sampling is determined by:
    creating an adjacency list E';
    calculating a number of arcs connected to each vertex in a set V of vertices;
    calculating a prefix sum of a number of pairs of incident arcs N(a) for each node a up to and including a;
    generating random numbers uniformly from a set [1 ... N];
    sorting the generated random numbers into a list R;
    initializing a vertex index variable v to 1 and the set H' to the empty set;
    incrementing the vertex index variable v by 1 until: N(v−1)<r<=N(v) for each random number r in the list R;
    selecting a vertex, a, from a set of vertices A(v) connected to vertex v;
    selecting a vertex, b, from a set of vertices A(v)−{v} connected to vertex v;
    adding a triple (a,b,v) to the set H'; and
    determining the set H' when the vertex variable v is greater than a number of nodes N.

3. A method comprising:
    determining a common neighborhood of documents sharing at least one common reference by
        creating a set H of triples (b,c,v) where b,c, and v are vertices;
        sampling randomly a subset of H of a specified size into a set H';
        creating a set C of points (a,b) that are a projection of a first two vertices of each triple in set H';
        calculating a number of occurrences, N(a,b), for each pair of vertices within the set C; and
        sorting the C nondecreasingly by N(a,b), wherein the set C of points (a,b) represents the documents in a common neighborhood, and the set E of edges represents the references of the documents within the common neighborhood; and
    predicting for a document in the common neighborhood of documents, a potential reference from the references of at least one other document in the common neighborhood of documents.

4. The method of claim 3, wherein the random sampling is determined by:
    creating an adjacency list E';
    calculating a number of arcs connected to each vertex in a set V of vertices;
    calculating a prefix sum of a number of pairs of incident arcs N(a) for each node a up to and including a;
    generating random numbers uniformly from a set [1 ... N];
    sorting the generated random numbers into a list R;
    initializing a vertex index variable v to 1 and the set H' to the empty set;
    incrementing the vertex index variable v by 1 until: N(v−1)<r<=N(v) for each random number r in the list R;
    selecting a vertex, a, from a set of vertices A(v) connected to vertex v;
    selecting a vertex, b, from a set of vertices A(v)−{v} connected to vertex v;
    adding a triple (a,b,v) to the set H'; and
    determining the set H' when the vertex variable v is greater than a number of nodes N.

5. An apparatus comprising:
    means for determining a common neighborhood of users sharing a common activity from a plurality of users by:
        means for creating a set H of triples (b,c,v) where b, c, and v are vertices;
        means for sampling randomly a subset of H of a specified size into a set H';

means for creating a set C of points (a,b) that are a projection of a first two elements of each triple in set H';

means for calculating a number of occurrences, N(a,b), for each pair of vertices within the set C; and means for sorting the C nondecreasingly by N(a,b) wherein the set C of points (a,b) represents the users in a common neighborhood, and the set E of edges represents the activities of the users within the common neighborhood.

6. The apparatus of claim 5, wherein the means for sampling randomly comprises:

means for creating an adjacency list E';

means for calculating a number of arcs connected to each vertex in a set V of vertices;

means for calculating a prefix sum of a number of pairs of incident arcs N(a) for each node a up to and including a;

means for generating random numbers uniformly from a set [1 . . . N];

means for sorting the generated random numbers into a list R;

means for initializing a vertex index variable v to 1 and the set H' to the empty set;

means for incrementing the vertex index variable v by 1 until: N(v−1)<r<=N(v) for each random number r in the list R;

means for selecting a vertex, a, from a set of vertices A(v) connected to vertex v;

means for selecting a vertex, b, from a set of vertices A(v)−{v} connected to vertex v;

means for adding a triple (a,b,v) to the set H'; and means for determining the set H' when the vertex variable v is greater than a number of nodes N.

7. An apparatus comprising:

means for determining a common neighborhood of documents sharing at least one common reference by means for creating a set H of triples (b,c,v) where b,c, and v are vertices;

means for sampling randomly a subset of H of a specified size into a set H';

means for creating a set C of points (a,b) that are a projection of a first two vertices of each triple in set H';

means for calculating a number of occurrences, N(a,b), for each pair of vertices within the set C; and means for sorting the C nondecreasingly by N(a,b), wherein the set C of points (a,b) represents the documents in a common neighborhood, and the set E of edges represents the references of the documents within the common neighborhood; and means for predicting for a document in the common neighborhood of documents, a potential reference from the references of at least one other document in the common neighborhood of documents.

8. The apparatus of claim 7, wherein the means for sampling randomly comprises:

means for creating an adjacency list E';

means for calculating a number of arcs connected to each vertex in a set V of vertices;

means for calculating a prefix sum of a number of pairs of incident arcs N(a) for each node a up to and including a;

means for generating random numbers uniformly from a set [1 . . . N];

means for sorting the generated random numbers into a list R;

means for initializing a vertex index variable v to 1 and the set H' to the empty set;

means for incrementing the vertex index variable v by 1 until: N(v−1)<r<=N(v) for each random number r in the list R;

means for selecting a vertex, a, from a set of vertices A(v) connected to vertex v;

means for selecting a vertex, b, from a set of vertices A(v)−{v} connected to vertex v;

means for adding a triple (a,b,v) to the set H'; and means for determining the set H' when the vertex variable v is greater than a number of nodes N.

* * * * *